H. LEIDEL.
ASH POT.
APPLICATION FILED SEPT. 24, 1912.
1,080,837.
Patented Dec. 9, 1913.
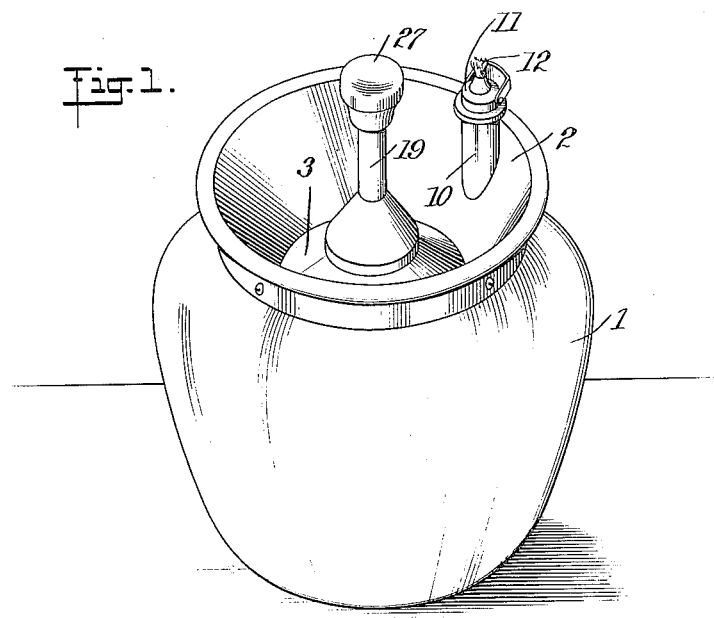
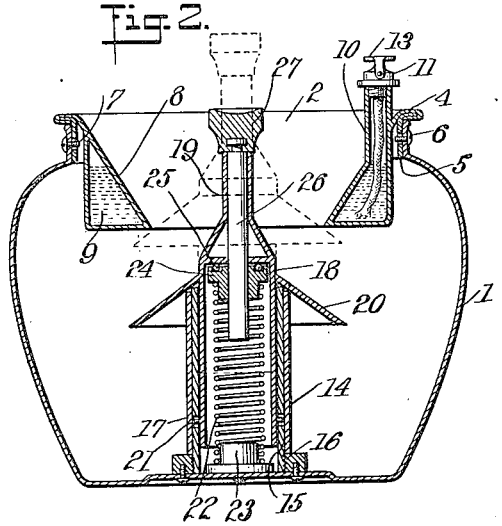
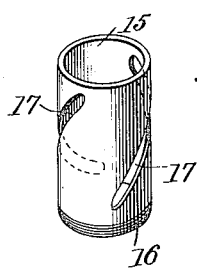
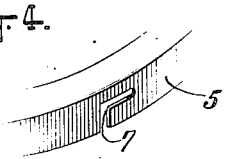
WITNESSES
INVENTOR
Henry Leidel,
BY Munn & Co.
ATTORNEYS

UNITED STATES PATENT OFFICE.

HENRY LEIDEL, OF NEW YORK, N. Y.

ASH-POT.

1,080,837.

Specification of Letters Patent.

Patented Dec. 9, 1913.

Application filed September 24, 1912. Serial No. 722,064.

*To all whom it may concern:*

Be it known that I, HENRY LEIDEL, a citizen of the United States, and a resident of the city of New York, Richmond Hill, borough of Queens, in the county of Queens and State of New York, have invented a new and Improved Ash-Pot, of which the following is a full, clear, and exact description.

This invention relates generally to smokers' articles, and more particularly is directed to an ash pot adapted to receive burnt matches, cigar ashes, cigar butts, etc.

The principal object of the invention is the provision of a new and improved ash pot for the purposes described, which will afford a closed receptacle, whereby the material entered therein is entirely inclosed, thereby doing away with foul odors, etc.

A further object of the invention is the provision in a unitary structure of an ash pot and a cigar lighter, the construction being such that the device is portable and easily manipulated.

A still further object of the invention is the provision of an ash pot having a movable closure member whereby access to the interior is permitted, movement of the closure member to permit such access also imparting a rotary movement to such member, whereby ashes or other refuse contained on the member will be thrown into the receptacle. It is also of some importance in the provision of this article that a structure which is pleasing in its appearance, and which will efficiently perform the functions intended, be supplied at a reasonably low figure, and such considerations have been kept in mind in the particular embodiment to be described.

Reference is to be had to the accompanying drawings forming a part of this specification, in which like characters of reference indicate corresponding parts in all the views, and in which—

Figure 1 is a perspective view of the ash pot; Fig. 2 is a vertical sectional view thereof; Fig. 3 is a perspective view of the slotted element coöperating with the closure member whereby rotary movement is imparted to the member; while Fig. 4 is a detail of the edge portion of the top of the pot, showing the construction whereby separation of the parts is permitted.

The construction shown embodies a receptacle 1 having a removable top 2 and a movable closure member 3, the particular shape and size of these parts being immaterial as far as the inventive idea is concerned, such idea being capable of embodiment in widely different designs suited for use in different surroundings. The receptacle 1 is of any desired form, being made preferably of sheet material which is cast or spun, the interior thereof receiving the burnt matches and smokers' refuse entered into the top member 2 and permitted to come into the receptacle by downward movement of the closure member 3 into the position shown in Fig. 2. The top member 2, exteriorly, is substantially cylindrical, the top portion being provided, preferably, with a peripheral portion 4 and a downwardly extending lip 5 adapted to be snugly received within the open top of the receptacle, the securing means comprising a coöperating pin 6 carried by the top of the receptacle 1, and a bayonet slot 7 in the lip 5, the pin being received in the slot, and the parts being held together by relative turning. The depth of this top member 2 may, of course, depend on the depth of the receptacle 1; in any event, the depth is sufficient to permit the formation of an inclined inner wall 8 extending entirely around the said top and spaced sufficiently from the outside thereof to form a container 9 adapted to receive alcohol, or other combustible liquid, it being noted that a tube 10 extends upwardly from this top member, the tube being provided with a cap 11 which carries a wick 12 which may be ignited, the wick being adapted to be extinguished by bringing the snuffer 13 into the position shown in Fig. 2.

The opening in the top member 2 is normally kept closed by means of the closure member 3, certain means being provided, however, for moving this member downwardly with a simultaneous rotary movement, whereby material contained on the inclined wall 8 of the member 2, or on the closure member 6, may be shaken therefrom and permitted to collect within the receptacle. While any particular construction for imparting such downwardly and also rotary movement may be availed of, the particular construction illustrated may be described as follows: Extending upwardly from the bottom of the receptacle 1, and fixed to the bottom thereof, is a preferably cylindrical housing 14, having a tubular element 15 substantially co-extensive therewith and in screw-threaded engagement at 16 with the lower portion thereof. Referring particularly to Fig. 3, it will be noted that this tubular element is provided with a plurality of inclined slots 17. The closure member proper is preferably of integral construction, and comprises a substantially cylindrical member 18 having an upwardly extending end portion 19 of reduced diameter, the cylindrical member having an angularly extending or inclined offset portion 20, which portion, in effect, forms the closure member proper, since, as indicated in broken lines in Fig. 2, it is adapted to entirely close the opening at the bottom of the top member 2. The outside of the cylindrical member 18 is provided with a number of lugs 21 which engage in the before-mentioned slots 17 in the cylindrical element 15, so that as the closure member is moved downwardly the engagement of the lugs in the slots imparts a rotary movement to such member. In order to maintain the closure member in normal position, as indicated in broken lines in Fig. 2, a helical spring 22 is positioned within the member 18, resting on the bottom of the receptacle and exerting pressure against the top portion of the said member 18; if so desired, a stop 23 may be contained within the parts with which the spring engages, the upper end of the spring being provided with a bearing 24 having a raceway formed therein in which a number of balls 25 are positioned which engage the top portion of the cylindrical member 18, whereby the friction developed in the movement of the parts may be avoided.

The construction described brings out the particular relation between the inner wall 8 of the top member and the downwardly extending or angularly inclined portion of the closure member, which is, that these members are converging, this relation insuring the deposit of material within the receptacle when the closure member is moved downwardly.

Contained within the reduced upper end portion 19 of the cylindrical member 18 is a rod 26 extending downwardly into the said member for a suitable distance, the upper end of the rod carrying a button 27 in revoluble relation therewith; as a matter of fact, the rod may be fixed and the button may turn relatively thereto, or the button and rod may be integral and may turn relatively to the closure member. However, the said relative movement permits pressure to be applied to the button 27 by the thumb or finger, the downward movement permitting the offset portion 20 to turn relatively to the button as the member moves, the arrangement thereby avoiding the necessity of imparting a twisting movement to the hand in order to move the parts; as mentioned, the helical spring 22 maintains the closure member in the broken lined position of Fig. 2, and the said balls 25 permit the spring to be fixed and the closure member to turn relatively thereto without the production of undue friction which would tend to difficulty of operation.

The housing 14, it will be noted, prevents the ashes or other refuse within the receptacle coming into engagement with the pin and slot, or with the helical spring, which would thereby tend to inefficiency and probable damage. The use of the rod 26 insures the proper relation of the bearing 24 to the closure member, since the said rod never leaves the opening within the said bearing. Finally, the construction of the top member 2 embodying, as it does, the container for combustible liquid, sets forth a portable lighter which may be easily grasped and carried about and tending to do away with the use of matches, and the indiscriminate throwing about of such things, often in a lighted condition, after being used. The relation of the parts as shown provides a container of pleasing appearance and substantial in its structure, which will prevent contamination of the air when smokers' refuse collects.

Having thus described my invention, I claim as new and desire to secure by Letters Patent:—

1. A device such as described, comprising a receptacle, a top member removably carried by the receptacle and permitting access to the interior thereof, the said top embodying spaced walls whereby a container is provided, and a burner carried by the said container.

2. A device such as described, comprising a receptacle having a removable top, the top being provided with an opening whereby access to the interior of the receptacle is permitted, the said top embodying spaced side walls forming a container, and a burner carried by the said container.

3. In an ash pot, a top member of substantially cylindrical formation and provided with a tapering inner wall, the space between the inner and outer walls forming a container, and a burner carried by the member, the container being adapted to hold a liquid to be consumed by the said burner.

4. An ash pot comprising a receptacle, an opening whereby access to the interior is permitted, and a movable member adapted to close the said opening, the said member partaking of a turning action when moved.

5. An ash pot embodying a receptacle, an opening whereby access to the interior is permitted, and a downwardly movable and revoluble closure member for the said opening.

6. An ash pot comprising a receptacle, an opening whereby access to the interior is had, a downwardly movable and revoluble member for closing the opening, and means for maintaining the member closely adjacent the opening.

7. An ash pot comprising a receptacle having an opening therein whereby access to the interior is permitted, a closure member adjacent the opening, the said member sloping downwardly, and means whereby when the member is moved to uncover the opening a turning motion will be imparted thereto, whereby material on the member may be deposited within the receptacle.

8. An ash pot comprising a receptacle, a removable top member having an opening extending therethrough, the inner wall of the member being inclined, a closure member adjacent the bottom of the said inner wall, the peripheral portion of the said member being below the central portion thereof, and means whereby when the said member is moved downwardly to uncover the opening a turning movement will be imparted thereto.

9. An ash pot comprising a receptacle, an opening therein, a top member removably positioned within the opening and having double spaced side walls, whereby a container is provided with a central opening through the same, a burner carried by the said member for consuming a combustible within the container, a closure member, means for maintaining it in position closely adjacent the said top member in order to prevent access to the receptacle, and means whereby, when the closure member is moved downwardly, a turning motion will be imparted thereto in order to facilitate the deposit of substance on the said member within the receptacle.

10. A device such as described, comprising a receptacle, a top member associated therewith and having an opening extending therethrough whereby access to the interior of the receptacle is provided, the said top member embodying spaced walls whereby a container is provided, and a burner carried by the said top member adapted to burn a combustible within the container.

11. An ash pot comprising a receptacle, an opening whereby access to the interior of the receptacle is permitted, a movable member adjacent the opening, means whereby the member may be moved to uncover the opening, and other means for returning the member to a position adjacent the opening.

12. An ash pot embodying a receptacle, an opening whereby access to the interior is permitted, a downwardly movable and revoluble member for closing the said opening, and means for retaining the member in closed position.

13. An ash pot comprising a receptacle, a top member associated therewith and having an opening extending therethrough whereby access to the interior of the receptacle is provided, the inner wall of the said member being inclined, a closure member adjacent the bottom of the said inner wall, the peripheral portion of the said member being below the central portion thereof, whereby the said wall and said member converge, means for maintaining the member in closed position, and other means whereby when the said member is moved downwardly to uncover the opening a turning movement will be imparted thereto.

14. An ash pot comprising a receptacle having an open side, a member positioned within the said open side and having spaced side walls whereby a container is provided, the said member being provided with an opening extending therethrough, a closure member, a spring for maintaining it in position adjacent the top member in order to prevent access to the receptacle, and a coöperating pin and slot for imparting a turning movement to the closure member when it is moved downwardly against the tension of the said spring in order to uncover the said opening.

15. In an ash pot, a top member provided with spaced annular walls, the inner one of which is tapering, providing an opening extending through the member, the spacing between the said walls forming a container, and a burner carried by the member, the container being adapted to hold a combustible to be consumed by the said burner.

In testimony whereof I have signed my name to this specification in the presence of two subscribing witnesses.

HENRY LEIDEL.

Witnesses:
  JOSEPH T. CUNNINGHAM,
  H. CLEVELAND LEIDEL.